(12) United States Patent
Werner

(10) Patent No.: US 7,389,696 B1
(45) Date of Patent: Jun. 24, 2008

(54) MEASURING DEVICE WITH A MICROSENSOR AND METHOD FOR PRODUCING THE SAME

(75) Inventor: Wolfgang Werner, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/623,924

(22) PCT Filed: Feb. 1, 1999

(86) PCT No.: PCT/DE99/00268

§ 371 (c)(1),
(2), (4) Date: Jul. 2, 2001

(87) PCT Pub. No.: WO99/46605

PCT Pub. Date: Sep. 16, 1999

(30) Foreign Application Priority Data

Mar. 10, 1998 (DE) ................................ 198 10 286

(51) Int. Cl.
*G01L 13/02* (2006.01)
(52) U.S. Cl. .......................................... 73/716; 73/736
(58) Field of Classification Search ................ 73/716, 73/754, 514.05, 488, 736
See application file for complete search history.

(56) References Cited

U.S. PATENT DOCUMENTS 3,247,723 A    4/1966 Yavne
5,719,333 A  *  2/1998 Hosoi et al. ............... 73/514.05
5,996,625 A  * 12/1999 Collado et al. ......... 137/614.19
6,592,823 B1 *  7/2003 Odermatt et al. ............... 422/88
6,666,088 B2 * 12/2003 Leung .......................... 73/488

FOREIGN PATENT DOCUMENTS

| DE | 38 21 690 A1 | 7/1989 |
|---|---|---|
| DE | 42 06 675 C2 | 9/1993 |
| DE | 196 00 398 C1 | 3/1997 |
| DE | 196 00 400 A1 | 7/1997 |
| DE | 196 00 399 C1 | 8/1997 |
| EP | 0 664 456 A1 | 7/1995 |
| WO | PCT/DE94/01092 | 3/1995 |
| WO | PCT/DE94/01103 | 4/1995 |
| WO | PCT/CA97/00442 | 12/1997 |

* cited by examiner

*Primary Examiner*—Andre J. Allen
(74) *Attorney, Agent, or Firm*—Laurence A. Greenberg; Werner H. Stemer; Ralph E. Locher

(57) ABSTRACT

A measuring apparatus includes at least one microsensor having at least two chambers filled with a gas. The chambers are connected to one another by at least one channel. Moreover, the chambers are sealed off to the outside in a gastight manner. Also provided is a detection device for detecting a gas stream flowing in the channel, which gas stream arises on account of different pressures prevailing in the chambers. The invention also relates to a method for producing the microsensor according to the invention.

35 Claims, 2 Drawing Sheets

MEASURING DEVICE WITH A MICROSENSOR AND METHOD FOR PRODUCING THE SAME

BACKGROUND OF THE INVENTION

Field of the Invention

The invention relates to a measuring apparatus having at least one microsensor and also to a method for producing such a measuring apparatus.

Microsensors and, in particular, micromechanical sensors for pressure or acceleration have acquired major technological importance in integrated electronic circuits. The known microsensors are designed as piezoresistive or capacitive pressure sensors for absolute, relative and differential pressure measurements. They are based on the principle that a deformation body made of a semiconductor material is deformed under the action of a force.

WO 95/09366 discloses an acceleration sensor having a movable mass part which is connected to a suspension via spring elements. The movable mass part comprises a movable plate of a capacitor. The other, fixed plate of the capacitor is connected to the housing. Accelerations acting on the mass part lead to a deflection of the mass part and thus to a change in the capacitance of the capacitor. This change in capacitance can be detected.

Furthermore, pressure sensors are known in which a deformation body made of a semiconductor material is connected in its edge region to a base body. In this case, the deformation body is preferably designed as a thin diaphragm. One or more piezoresistive resistance tracks are arranged in those regions of the diaphragm in which a particularly high mechanical stress occurs. By this means, a deflection of the deformation body leads to a detectable electrical voltage.

Although in practice the known microsensors have proved successful in diverse ways, they are nonetheless associated with the disadvantage that, for a sufficiently large electrical signal, a correspondingly large extent of the deformation body with correspondingly large dimensions of the sensor is necessary. Arbitrary miniaturization for integrability in an integrated electrical circuit is not readily possible since, on the one hand, there are micromechanical limits on the design of the diaphragm or cantilever, or restrictions of the measurement accuracy or of the signal level obtained have to be accepted.

SUMMARY OF THE INVENTION

The invention is based on the object of providing a measuring apparatus having one or more microsensors with small dimensions, and also a method for producing it, which enables integration in existing monolithic semiconductor circuits without difficulty and which nevertheless ensures a high accuracy or signal resolution during the detection of the physical quantity to be measured, such as, in particular, pressure, acceleration or temperature.

This object is achieved by a measuring apparatus and a production method according to the claims.

The invention provides for the measuring apparatus to have at least one microsensor having in each case at least two chambers connected to one another by at least one channel, which chambers are filled with a gas and are sealed off to the outside, and provision is made of a detection device for detecting the gas stream flowing in the at least one channel on account of different pressures prevailing in the chambers.

The invention thus provides for a microsensor to be equipped in such a way that it has a plurality of cavities, at least a portion of said cavities being connected to one another in such a way that a gas contained in the cavities can flow from one cavity into one or more other cavities. In this case, the cavities are situated within a semiconductor material, for example.

Following the principle of the invention, normal ambient air or a gas such as nitrogen is used as the filling gas. In order to obtain a distinct pressure change and thus a sufficient gas stream (for example through acceleration of the entire microsensor), it is expedient to use a gas having the highest possible relative density and thermal capacity.

In a particularly preferred embodiment of the invention, the detection device can be heated or cooled, by means of a heating/cooling element assigned to it, to a measurement temperature which differs from the temperature of the gas in the chambers.

A particularly preferred embodiment of the invention provides for a change in the temperature of the detection device to be detected, said change taking place on account of the gas stream flowing between the chambers through the channel, and for the detection device, as a reaction to this, to supply an electrical measurement signal, corresponding to the change in temperature, at the output of the detection device.

A furthermore preferred embodiment of the invention provides for the heating/cooling element coupled to the detection device to be formed by an electrical heating resistor, a heating transistor, a heating diode or a Peltier element.

In this case, in an advantageous refinement of the invention, the detection device may expediently be formed by the heating/cooling element itself.

A structurally particularly simple and therefore preferred embodiment of the invention is distinguished by the fact that the detection device is formed by a thermoelement.

A furthermore particularly preferred refinement of the invention provides for there to be a reference channel which opens only in a chamber, a reference detection device having predetermined electrical properties being assigned to said reference channel. In this case, it is advantageous that the influence of the temperature of the microsensor itself can be eliminated in circuitry terms by a comparison of the signals of the detection device and of the reference detection device.

In this case, a preferred refinement provides for the detection device and the reference detection device to be connected up in a measuring bridge circuit.

A further advantageous embodiment of the invention provides for an additional detection device having predetermined electrical properties to be assigned to the detection device. In this case, the additional detection device is heated or cooled by the heated or cooled gas stream, respectively, the temperature of which has been altered by the detection device at the measurement temperature, in the case of the gas stream direction from the detection device to the additional detection device, and, as a reaction to this, supplies an electrical measurement signal at its output and, in the case of a gas stream direction from the additional detection device to the detection device, supplies no measurement signal at its output. The advantage of this arrangement resides in the fact that the gas stream direction can be detected.

In order to be able to detect the gas stream particularly well, a further embodiment of the invention provides for the detection device and/or the additional detection device to be formed within at least one channel.

In an advantageous refinement of the invention, both the detection device and the reference detection device or the additional detection device are arranged in or on an edge region of a wall or are formed so as to comprise the wall. Accordingly, in a particularly preferred refinement of the invention, the wall is composed of semiconductor material.

It is furthermore preferable for the chambers and the channels and/or the reference channel of the microsensor to be formed in or on a semiconductor substrate. The advantage of this embodiment resides in the integrability of the measuring apparatus in an integrated circuit formed in a semiconductor substrate.

For the detection of an external pressure or a change in pressure, one embodiment of the invention provides an elastic diaphragm that effects sealing-off to the outside.

A furthermore preferred advantageous refinement of the invention is distinguished by the fact that a multiplicity of microsensors are arranged in matrix form in rows and columns and can be driven individually by means of a drive circuit. In this case, it is advantageous that data of high resolution, which only becomes possible through the small size of the microsensors, can be detected by means of the sensor in a planar manner.

The invention furthermore relates to a method for producing a microsensor formed monolithically in or on a substrate. In this case, provision is made for forming at least two chambers with at least one channel connecting the chambers, and also a reference channel which opens only into one chamber. Afterwards, a detection device for detecting a gas stream flowing in the at least one channel is formed, which gas stream arises on account of different pressures prevailing in the chambers. In the next step, the chambers, the channels and the reference channel are filled with a gas and closed off to the outside in a gastight manner.

In a particularly preferred method step, the closure of the chambers and the at least one channel connecting the chambers is effected by the flowing of a covering material. In this case, the covering material is preferably of a nature such that the chambers and the channels and also the reference channel are not fully filled. In this case, in a furthermore preferred method step, the flowing of the covering material takes place in the presence of a gas intended for the filling of the chambers.

In a particularly preferred method, the chambers, the at least one channel connecting the chambers, and also the reference channel in or on the substrate and also the detection device and also the reference and the additional detection devices are fabricated by the following process steps:

- coating of the substrate with a sacrificial layer, which is composed, in particular, of $SiO_2$,
- patterning of the detection device and also of the reference and the additional detection devices with their leads on the sacrificial layer, in particular by means of an etching method,
- application of a second sacrificial layer,
- application of a first covering layer, in particular made of polycrystalline silicon,
- provision of the covering layer with holes at least partially in the regions under which the chambers and/or channels are intended to be produced, and
- etching out of the two sacrificial layers through the holes in the covering layer for the purpose of producing the chambers and/or channels.

In order to prevent diffusion of the gas into the semiconductor material forming the wall, it is expedient, in a further preferred method step, prior to the closure of the chambers, to provide at least a portion of those areas of the semiconductor substrate which face the chambers and/or of those areas of the semiconductor substrate which face the channel with a blocker layer. In this case, it is also advantageous that a reaction of the filling gas with the surfaces is prevented.

In addition to their advantageous properties and the fact that they can be produced easily, the microsensors according to the invention are also distinguished by their diverse application possibilities.

Thus, it is possible to use a microsensor according to the invention as an acceleration sensor, as a pressure sensor or as a temperature sensor.

Further advantages, special features and expedient developments of the invention emerge from the subclaims.

BRIEF DESCRIPTION OF THE DRAWINGS

A preferred exemplary embodiment of the invention is explained in more detail below with reference to the drawings, in which.

DESCRIPTION OF THE PREFERRED EMBODIMENTS

Figure 1:
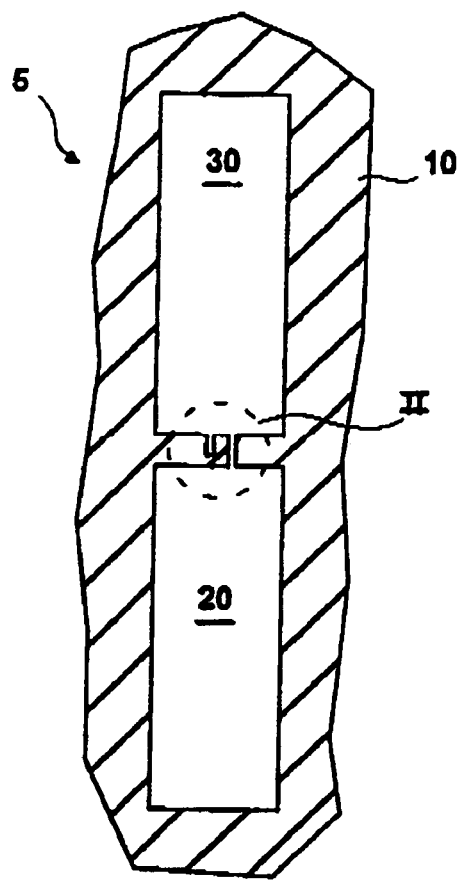
FIG. 1 shows a schematic sectional view of a measuring apparatus having a microsensor according to the invention.
Figure 2:
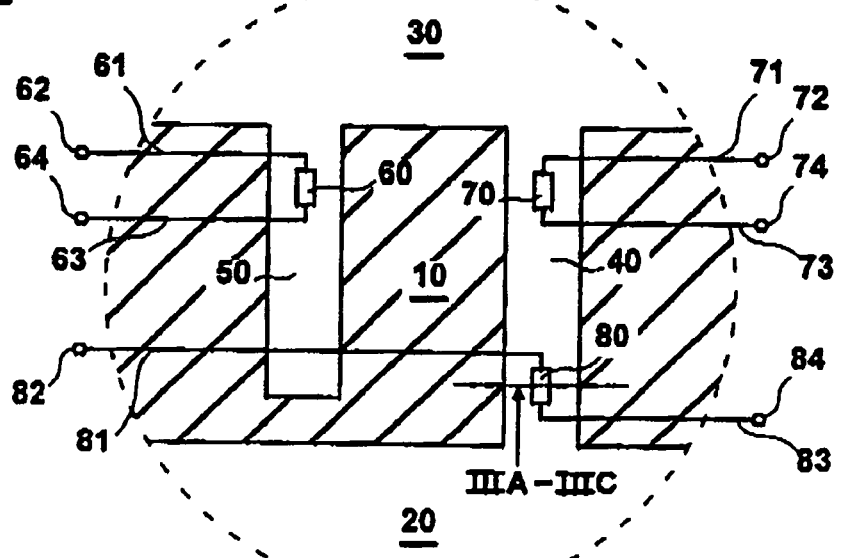
FIG. 2 shows an enlarged detail of a partial region II from FIG. 1.

The measuring apparatus having at least one microsensor according to the invention may be configured either as an acceleration sensor, as a pressure sensor or as a temperature sensor. The same basic concept can be used in each of these configurations. In the case of the measuring apparatus according to the invention, the basic principle of the acceleration, pressure or temperature measurement is based on the detection of a gas stream which has arisen on account of the quantity to be measured. To that end, two chambers which are sealed off in a gastight manner and are filled with a gas are connected to one another by a channel. Through this channel, pressure differences prevailing in the two chambers are equalized by a gas stream that is established. In this case, the pressure difference can be achieved through an acceleration of the microsensor integrated in the measuring apparatus or a change in the temperature of the gas in a chamber. The gas stream is preferably detected directly in the channel connecting the chambers, by means of a detection device, and is converted into an electrical signal.

The exemplary embodiment—illustrated in the figures—of a measuring apparatus according to the invention comprises at least one microsensor having two chambers 20, 30 filled with a gas, the chambers 20, 30 being connected to one another by a channel 40, the chambers 20, 30 moreover being sealed off to the outside in a gastight manner, and a detection device 70 for detecting a gas stream flowing in the channel 40 being provided, which gas stream arises on account of different pressures prevailing in the chambers. The detection device 70 is assigned a heating/cooling element by means of which the detection device can be heated or cooled to a measurement temperature which differs from the temperature of the gas in the chambers 20, 30.

In the case of the exemplary embodiment shown in the figures, the two chambers 20 and 30 are situated in a semiconductor substrate 10. The chambers 20 and 30 preferably have dimensions in the millimeters range. By way of example, the chambers 20 and 30 each have a width of one millimeter, a height of two micrometers and a length of three millimeters. The channel 40 connecting the chambers 20 and 30 to one another has a cross-sectional area in the micrometers range, for example from 1 to 10 μm². Preferably, the length of the channel is greater than its width by a factor of from 2 to 10. In the present case, the length of the channel 40 is approximately 10 μm.

In order to detect the gas stream, the detection device 70, formed by a resistor, is arranged in the channel 40. The resistor 70, which is heated to measurement temperature by a heating arrangement (not illustrated) or a current passed through it, is cooled by the gas stream passing through the channel 40.

Prior to the commencement of a gas stream, the resistor 70 is at a specific measurement temperature, and changes its resistance in accordance with its temperature coefficient as a result of the cooling effect of the gas stream sweeping past it; in this way, the current passed through it in order to heat it or the voltage dropped across it varies. The corresponding electrical signal can be tapped off at the interconnects 71 and 73 leading from the microsensor, or at the outputs 72 and 74. In the case of a linear temperature coefficient, the change in resistance is to a first approximation proportional to the gas stream through the channel 40. The direction of the gas stream and thus the sign of the quantity to be measured can be detected by an additional detection device 80, formed by an unheated resistor 80. This unheated resistor 80 is arranged in a spatial proximity to the heated resistor 70 and experiences heating through a gas stream passing from the resistor 70 in the direction of the resistor 80, since the gas stream has been heated over the heated resistor 70. Since this happens only in the case of a gas stream direction from the heated resistor 70 to the unheated resistor 80, no change in temperature of the resistor 80 is established in the case of an opposite gas stream direction. A change in resistance which is established in the case of heating of the resistor 80 in accordance with its temperature coefficient can be tapped off via the interconnects 81 and 83 leading from the microsensor, or via the outputs 82 and 84.

In order to prevent influences on the signal to be measured caused by the inherent temperature of the microsensor 5, provision is made of a reference detection device 60 formed by a resistor 60. In this case, the resistor 60 is arranged in a reference channel 50, whose dimensions are similar to those of the channel 40. The reference channel 50 is situated parallel to the channel 40 in the semiconductor substrate 10, and is connected only to the chamber 30, with the result that a gas stream cannot form in it. The reference channel 50 has essentially the same cross section as the channel 40. Its length is somewhat shorter, however, with the result that the reference channel 50 ends before the other chamber 20.

In order to preclude the temperature influences of the microsensor, the resistor 70 with the resistor 60 can be incorporated together in a bridge circuit (not specifically illustrated), with the result that only a gas flow between the chambers can generate a corresponding signal.

The resistors 60, 70 and 80 can, in principle, be composed of any desired material. In particular, metals or highly doped semiconductors are suitable as materials for the resistors. The use of highly doped semiconductor materials for the resistors 60, 70 and 80 has the advantage that the resistors 60, 70 and 80 can be produced particularly simply in the process for the production of the integrated circuit comprising the measuring apparatus.

It is also possible for the detection device 70 and/or the reference 60 and additional detection device 80 to be arranged or formed in front of an opening in the channel 40 and/or reference channel 50, respectively. The detection device 70 and/or the reference 60 and additional detection device 80 may, furthermore, be formed or identified by a partial region of the semiconductor material of the channel 40 and/or of the reference channel 50, respectively, said semiconductor material forming the wall, or be formed or identified by a partial region of the semiconductor material forming the wall which lies in front of an opening in a channel 40.

Figure 3A:
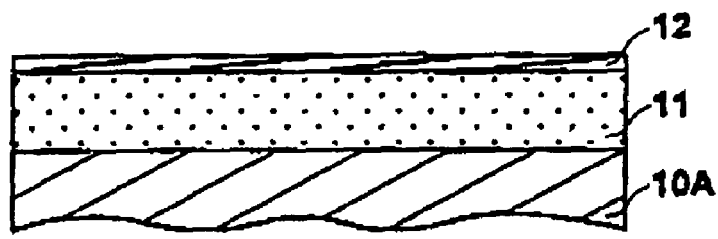
FIGS. 3A to 3C show schematic sectional views for elucidating a method for producing a microsensor according to the invention.
Figure 3B:
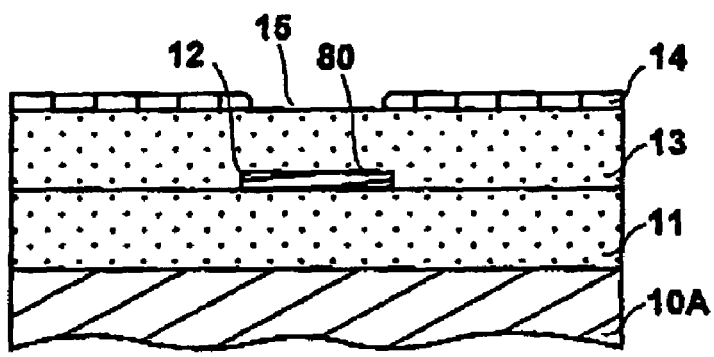
Figure 3C:
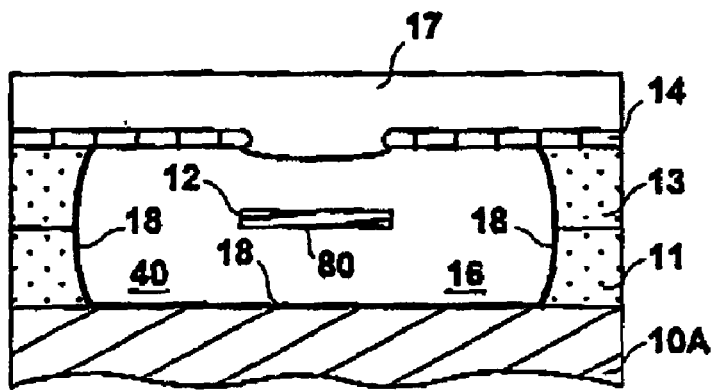

The production method comprises the steps which are illustrated in more detail in FIGS. 3A to 3C:

According to FIG. 3A, a support layer 10A, preferably composed of silicon, is covered with a first sacrificial layer 11, composed of $SiO_2$. The first sacrificial layer 11 preferably has a thickness of between 0.5 μm and 5 μm.

Afterwards, in accordance with FIG. 3A, an electrically conductive patterning layer 12 is deposited for the purpose of forming resistors 60, 70, 80. This layer is preferably composed of doped polycrystalline silicon. The patterning layer 12 is patterned using photolithography and etching methods which are known from semiconductor technology. The patterning is preferably effected such that both the resistors 60, 70 and 80 and their leads 61, 63, 71, 73, 81 and 83 are produced.

After the formation of the resistors 60, 70 and 80 and the leads 61, 63, 71, 73, 81 and 83, a second sacrificial layer 13 is deposited in accordance with FIG. 3B. The second sacrificial layer 13 preferably has the same thickness as the first sacrificial layer 11.

In accordance with FIG. 3B, a covering layer 14 is applied to the second sacrificial layer 13. The covering layer 14 is composed of polycrystalline silicon, for example. Using photolithography and etching methods which are likewise known from semiconductor technology, the covering layer 14 is provided in regions with etching openings 15, under which a cavity 16 in the form of chambers or channels is fabricated in a subsequent process step.

Through the etching openings 15 in the covering layer 14, the two sacrificial layers 11 and 13 are etched out selectively, thereby producing the chambers 20, 30 and the channel 40 and also the reference channel 50 in accordance with FIG. 3C.

If appropriate, it is then possible for at least a portion of the areas which are produced in the substrate 10 and form the two chambers 20, 30 and the channel 40 connecting the chambers, and also the reference channel 50, prior to the closure, to be provided with a blocker layer 18 which prevents or at least reduces diffusion of the filling gas into the surrounding semiconductor material 10 (FIG. 3C).

By coating the covering layer 14 with a covering material 17—for example flowing glass (preferably borophosphorus silicate glass, BPSG)—and subsequent flowing, the etching openings 15 in the covering layer 14 are closed off in accordance with FIG. 3C. With BPSG it is expedient to carry out this flowing process at a temperature of approximately 800° C. to 1100° C. The closure is effected in a gas atmosphere, if appropriate at relatively high pressures, in order to fill the chambers with a desired gas.

The method of operation of the measuring apparatus according to the invention, said measuring apparatus operating as an acceleration sensor, is explained in more detail below.

In accordance with the barometric height formula $$p = p_0 \exp\left[\frac{\rho_0 g_0}{p_0} h\right]$$

the pressure in a gas column is dependent on the relative density $\rho_0$ of the gas, the acceleration $g_0$ and the height h. For a sealed system having small dimensions, the following holds true for the pressure $p=p_a+\rho_a g h_a$, where $h_0$ is the effective height difference and $p_a$ is the static internal pressure. A change in the acceleration $\Delta g$ leads to a pressure difference $\Delta p=\rho_0 h_0 \Delta g$ between the two chambers. If use is made of a heavy gas where $\rho_0 \sim 10$ kg/m$^3$ (e.g. SF$_6$, xenon), then for a change in acceleration by $\Delta g=1$ $g_0$ (acceleration due to gravity) and h=3 mm, a pressure difference of $\Delta p \sim 0.3$ Pa is produced. Given a static internal pressure of 1 at $10^5$ Pa, this means a pressure change between the chambers 20 and 30 of $$\frac{\Delta p}{P_0} \cdot \frac{0.3 Pa}{10^5 Pa} = 0.3 \times 10^{-5}.$$

Given a chamber volume of V=$3 \times 10^3 \times 10^3 \times 2$ $\mu$m$^3$ and a channel cross section of a=$1 \times 1$ $\mu$m$^2$, this means that a gas column with a length of $$v \frac{\Delta p}{P_0} \cdot \frac{1}{a} = 6 \cdot 10^6 \mu m^3 \cdot 0.3 \cdot 10^{-5} \cdot \frac{1}{1 \mu m^2} \approx 20 \mu m$$

streams past the resistor and causes a corresponding change in the conductivity of the resistor 70 through cooling thereof. The sensitivity of the system can be set by the parameters $p_0$, V and $h_0$. The derivative dg/dt of the acceleration is measured. For an airbag system with a measurement range of from 0 to 50 g, sufficient accuracy can be achieved using the parameters chosen by way of example above. Functional testing without acceleration of the system is possible through a heating resistor which is incorporated in one of the two chambers and, upon startup, leads to a gas stream in the channel between the chambers.

The way in which the measuring apparatus according to the invention operates as a pressure sensor is explained below.

For this purpose, the arrangement in accordance with the figures is embodied in such a way that one of the chambers is bounded by an elastic diaphragm. In the event of a deflection of the diaphragm by 1% of the chamber thickness a, a gas column having the following length flows past the resistor 70:

$$\Delta p = \frac{p_0 \cdot \Delta v}{v} = 10^5 Pa \cdot 0.01 = 10^3 Pa.$$

$$L_{gas\ column} = V \cdot \frac{\Delta p}{p_0} \cdot \frac{1}{a} = 3 \times 10^3 \times 10^3 \times 2 \mu m^3 \cdot 0.01 \cdot \frac{1}{1 \mu m^3} = 6 \cdot 10^4 \mu m$$

V=volume of a chamber

Static pressure in the chambers $P_a=10^5$ Pa

If the dimensions of the chambers 20, 30 are reduced to, for example, $100 \times 100 \times 2$ $\mu$m$^3$, then a gas column having a length of 200 $\mu$m flows past the resistor. This means that a very sensitive pressure measuring system can be constructed with a chamber area of just 0.01 mm$^2$. As in the case of an accelerometer, the derivative of the pressure is measured in this case, too. In order to obtain the pressure as an output quantity, the electronic signal evaluation comprises integration of the signal.

If both chambers 20, 30 are bounded by an elastic diaphragm, then a differential pressure sensor can also be constructed with the arrangement according to the invention.

A further configuration of the microsensor illustrated in the figures as a temperature sensor is possible for example by one of the chambers being provided with a layer which absorbs thermal radiation, while the other chamber is configured in such a way that it reflects thermal radiation. Thus, a very sensitive temperature measuring system can be constructed with this arrangement. If the total temperature in a chamber is increased by 1° C., for example, then a gas column having the following length flows past the resistor 70:

$$\frac{P \cdot V}{T} = const;\ V = const.$$

$$\frac{\Delta p}{p} = \frac{\Delta T}{T} = \frac{1}{300}$$

$$L_{gas\ column} = V \cdot \frac{\Delta p}{p} \cdot \frac{1}{a} = 3 \times 10^3 \times 10^3 \times 2 \mu m^3 \cdot \frac{1}{300} \cdot \frac{1}{1 \mu m^3} = 2 \cdot 10^4 \mu m$$

Given a chamber area of just 0.01 mm$^2$, for example, and a temperature change of 0.1° C., a gas column having a length of as much as 7 $\mu$m flows past the resistor 70.

The measuring apparatus may also have a multiplicity of the temperature microsensors described arranged in a one- or two-dimensional array, which microsensors are monolithically integrated with the evaluation circuit and by means of which they can be addressed individually. Such an arrangement may be used for example as sensor element in an infrared camera. Integration with an evaluation circuit is also possible in the other embodiments.

It should be noted that in the measuring arrangement for acceleration, pressure or temperature, the operating pressure $p_a$ is temperature-dependent owing to $$\frac{P \cdot V}{T} = const.,$$

the consequence of which is that, for a given signal ($\Delta g$, $\Delta p$, $\Delta T$), the length of the gas column depends on the temperature. Corresponding temperature compensation by way of the heating of the resistor 70 can correct this.

I claim:

1. A measuring apparatus, comprising:
    at least one microsensor having:
        at least two chambers gastightly sealed off to the environment and filled with a gas;
        a channel fluidically connecting said at least two chambers to one another; and
        a detection device disposed in said channel for detecting a gas stream flowing in said channel due to different pressures prevailing in said at least two chambers.

2. The measuring apparatus according to claim 1, wherein:
    said detection device has a heating/cooling element; and
    said detection device is at least one of heated and cooled by said heating/cooling element to a measurement temperature differing from a temperature of said gas in said chambers.

3. The measuring apparatus according to claim 1, wherein:
    said detection device has an output; and
    said detection device supplies an electrical measurement signal at said output in reaction to a detected change in a temperature of said detection device, the change in temperature taking place due to said gas stream flowing between said chambers through said channel.

4. The measuring apparatus according to claim 1, wherein said heating/cooling element is one of the group consisting of an electrical heating resistor, a heating transistor, and a heating diode.

5. The measuring apparatus according to claim 1, wherein said heating/cooling element is a Peltier element.

6. The measuring device according to claim 1, wherein said detection device is a thermoelement.

7. The measuring apparatus according to claim 1, wherein said detection device is a heating/cooling element.

8. The measuring apparatus according to claim 1, including:
   a reference channel opening only in one of said at least two chambers; and
   a reference detection device having predetermined electrical properties and being disposed at said reference channel.

9. The measuring apparatus according to claim 1, wherein:
   said detection device includes an additional detection device with predetermined electrical properties and an output;
   said additional detection device is at least one of heated and cooled by the gas stream and:
      supplies an electrical measurement signal at said output in reaction to an altering of the gas stream temperature by said detection device at a measurement temperature when the gas stream travels in a direction from said detection device to said additional detection device; and
      supplies no measurement signal at said output when the gas stream travels in a direction from said additional detection device to said detection device.

10. The measuring apparatus according to claim 8, wherein said detection device and said reference detection device are connected together in a measuring bridge circuit.

11. The measuring apparatus according to claim 8, wherein:
   said microsensor has at least one wall with an edge region; and
   both said detection device and said reference detection device are disposed at said edge region of said wall.

12. The measuring apparatus according to claim 11, wherein both said detection device and said reference detection device are disposed in said edge region of said wall.

13. The measuring apparatus according to claim 11, wherein both said detection device and said reference detection device are disposed on said edge region of said wall.

14. The measuring apparatus according to claim 8, wherein:
   said microsensor has at least one wall; and
   both said detection device and said reference detection device are formed of said wall.

15. The measuring apparatus according to claim 9, wherein:
   said microsensor has at least one wall with an edge region; and
   both said detection device and said additional detection device are disposed at said edge region of said wall.

16. The measuring apparatus according to claim 15, wherein both said detection device and said additional detection device are disposed in said edge region of said wall.

17. The measuring apparatus according to claim 15, wherein both said detection device and said additional detection device are disposed on said edge region of said wall.

18. The measuring apparatus according to claim 9, wherein:
   said microsensor has at least one wall; and
   both said detection device and said additional detection device are formed of said wall.

19. The measuring apparatus according to claim 11, wherein
   said wall is of semiconductor material.

20. The measuring apparatus according to claim 15, wherein
   said wall is of semiconductor material.

21. The measuring apparatus according to claim 1, wherein:
   said microsensor has a semiconductor substrate; and
   at least one of said chambers and said channel are formed in said substrate.

22. The measuring apparatus according to claim 8, wherein:
   said microsensor has a semiconductor substrate; and
   said reference channel is formed in said substrate.

23. The measuring apparatus according to claim 9, wherein said additional detection device is disposed at said channel.

24. The measuring apparatus according to claim 1, wherein at least one of said chambers has an elastic diaphragm effecting the gastight seal from the environment.

25. The measuring apparatus according to claim 1, wherein:
   said microsensor is a plurality of microsensors disposed in a matrix in rows and columns; and
   said microsensors are to be driven by a drive circuit.

26. A method for producing a measuring apparatus having at least one microsensor, which further comprises:
   forming a measuring device monolithically in a substrate by:
      forming at least two chambers with at least one channel connecting the chambers;
      forming a detection device in the channel for detecting a gas stream flowing in the channel, the gas stream arising due to different pressures prevailing in the chambers;
      filling the chambers and the channel with a gas;
      gastightly closing the chambers with respect to the environment; and
      forming a reference channel opening only into one of the chambers.

27. The method according to claim 26, which further comprises carrying out the closing step by flowing a covering material over the chambers, the channel, and the reference channel and not fully filling any one of the chambers, the channel, or the reference channel.

28. The method according to claim 27, which further comprises carrying out the closing step by flowing the covering material in the presence of a gas intended to fill the chambers and the channel in the filling step.

29. The method according to claim 27, wherein the covering material is of borophosphorus silicate glass.

30. The method according to claim 26, which further comprises:
   fabricating each of:
      the chambers;
      the channel;
      the reference channel;
      the detection device;
      a reference detection device; and
      at least one additional detection device,
   in the substrate according to the following steps:
      coating the substrate with a sacrificial layer;
      patterning the detection device, the reference detection device, and the additional detection device and leads for the detection device, the reference detection device, and the additional detection device on the sacrificial layer;

applying a second sacrificial layer;

applying a covering layer;

forming holes in the covering layer at least partially in regions under which at least one of the chambers, the channel, and the reference channel are to be produced; and etching out the first and second sacrificial layers through the holes to produce at least one of the chambers, the channel, and the reference channel.

31. The method according to claim 30, wherein the sacrificial layer is $SiO_2$.

32. The method according to claim 30, which further comprises carrying out the patterning step by etching the detection device, the reference detection device, the additional detection device, and the leads on the sacrificial layer.

33. The method according to claim 30, wherein the covering layer is of polycrystalline silicon.

34. The method according to claim 30, which further comprises:

carrying out the closing step by flowing a covering material over the chambers, the channel, and the reference channel and not fully filling any one of the chambers, the channel, or the reference channel; and prior to closure by the covering material of at least one of the chambers, the channel, and the reference channel, applying a blocker layer on at least a portion of areas produced in the substrate and forming the chambers, the channel, and the reference channel, the blocker layer at least reducing diffusion of the filling gas into surrounding semiconductor material of the substrate.

35. The method according to claim 34, which further comprises preventing diffusion of the filling gas into surrounding semiconductor material of the substrate with blocker layer.

* * * * *

UNITED STATES PATENT AND TRADEMARK OFFICE
CERTIFICATE OF CORRECTION

PATENT NO. : 7,389,696 B1  Page 1 of 1
APPLICATION NO. : 09/623924
DATED : June 24, 2008
INVENTOR(S) : Wolfgang Werner It is certified that error appears in the above-identified patent and that said Letters Patent is hereby corrected as shown below:

Title Page; should read;

(86)

§ 371 (c)(1),
(2), (4) Date:    November 20, 2000

Signed and Sealed this

Twelfth Day of August, 2008

JON W. DUDAS
*Director of the United States Patent and Trademark Office*